Jan. 15, 1952

C. W. SHERWIN 2,582,608

RANGE MARKER GENERATOR

Filed Jan. 4, 1945

2 SHEETS—SHEET 1

FIG. 1

Inventor
CHALMERS W. SHERWIN

By  F. T. Bush
Attorney

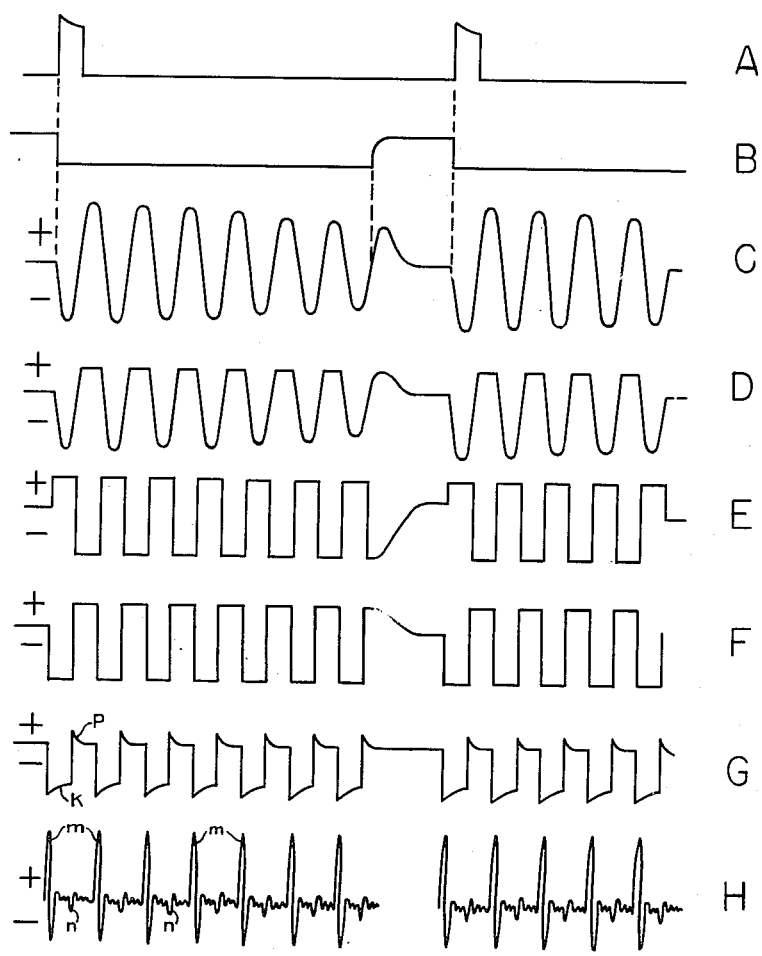

Patented Jan. 15, 1952

2,582,608

UNITED STATES PATENT OFFICE 2,582,608

RANGE MARKER GENERATOR

Chalmers W. Sherwin, Belmont, Mass., assignor, by mesne assignments, to the United States of America as represented by the Secretary of the Navy Application January 4, 1945, Serial No. 571,318

11 Claims. (Cl. 315—24)

1

This invention relates to a means for graduating the time sweep of a cathode ray tube and particularly to a means for calibrating such precision range indicators as are now used in radio echo detection systems.

One of the most valuable applications of a radio echo detection system is that of determining the range or distance from a radio echo detection location to the target under consideration. Consequently, considerable importance is attached to the devices used to indicate the distance from a target. In general, range determination is accomplished by means of an index marker (fiducial line) placed on a transparent strip which is positioned over the face of the cathode ray tube and manually operated such that when the fiducial line is adjusted to lie in positional correspondence with an echo signal, the range will be read from a graduated scale which is associated with the fiducial line. Alternatively an electronic index marker such as that described in the patent application of LaVerne R. Philpott entitled "Sweep Circuit Generator" filed June 8, 1944, Serial No. 539,373, may be used wherein a movable vertical step is placed on the electron beam itself. The position of this marker is controlled by a graduated potentiometer from which the range is read.

In using either of the above methods and in order to maintain a certain degree of accuracy, it is of course necessary to periodically calibrate the index marker device. The simplest means for doing this, is to use a transparent calibrating scale which can be disposed, as needed, on the face of the cathode ray tube. At first, this method might seem to be the ideal solution to the problem, but it must be remembered that in order for the calibrating scale to be accurate, the linearity of the sweep and its length would have to remain constant at all times. Consequently, a system of placing time markers on the cathode ray beam trace itself which will always occur at the same spacings as far as time is concerned is desirable. With this accomplished, the fluctuations in sweep linearity will not impair the time spacings of the markers.

It is therefore an object of this invention to provide a means for graduating the time sweep of a cathode ray tube.

It is another object of this invention to provide a simple reliable means for calibrating any of the time index marker devices of the foregoing types.

It is another object of this invention to provide a series of accurately known and equally spaced time markers on the time sweep of a cathode ray tube.

Other objects and features of the present invention will become apparent upon a careful consideration of the following detailed description when taken together with the accompanying drawings.

Fig. 1 is a schematic diagram showing a preferred embodiment of the invention together with the manner in which it is connected to a conventional radio echo system, and Fig. 2 is a series of voltage time plots which illustrate the operation of Fig. 1.

Reference is now had in particular to Fig. 1 wherein there is illustrated a time, or range marker generator, which is constructed in accordance with the teachings of this invention, and the manner in which it is connected to a conventional type radio echo detection system with which it is designed to operate. The latter is made up of conventional components arranged in a conventional manner, including in general, a pulse transmitter 22, a receiver 24, a cathode ray tube 19, a saw-tooth generator 26 and a timer 20.

The pulse transmitter 22 is designed to produce high frequency oscillations in the form of short time duration pulses occurring at some predetermined recurrence rate, so that it is not on continuously, but is operating during the period of the pulses only and is off in the interval between pulses.

The recurrence rate of these pulses are controlled by the timer, 20, which produces a sequence of synchronizing pulses somewhat as indicated in plot A of Fig. 2. These synchronizing pulses actuate the modulator 21 which in turn forms a keying pulse for the transmitter 22 and thereby controls the time duration of the transmitter pulses.

The duplexer 23 is essentially a switching device which disconnects the receiver 24 from the antenna (not shown) during the operation of the transmitter 22 and then disconnects the transmitter from the antenna when the transmitter is not operating, thus permitting the transmission and reception of electromagnetic waves to be carried on from a single antenna. Such a device is described in the patent application of James L. Lawson entitled "Protection of Receivers against Overload," Serial No. 479,662, filed March 18, 1943.

To measure object range, the reflected signal is detected and amplified by the receiver 24 (usually of the superheterodyne variety) and applied to the linear beam sweep of the cathode ray tube 19. This sweep is produced by a known type of saw-tooth voltage generator 26 under control of the wide gate generator 25. This latter circuit is customarily a known type of multivibrator which produces, in response to the synchronizing pulse output from timer 20, a negative wide gate pulse somewhat as indicated in plot "B" of Fig. 2.

In its preferred form, the time marker generator consists of a plurality of pretuned inductance-capacitance tank circuits 14, 15 and 16, a pair of squaring amplifiers 11 and 12, a pulse sharpening amplifier 13 and a keying tube 10. The latter, like the saw-tooth generator 26 is under control of the wide gate generator 25 and is arranged to shock excite the aforementioned tank circuits into oscillation. In response of these oscillations, the pulse sharpening amplifier 13 produces high resolution time marker pulses which are applied to the cathode ray tube 19. For purposes of illustration, the keying tube 10 is shown as either a higher or low vacuum triode, but it must be understood that it may assume other forms including a simple diode.

The operation of the radio echo detection system here shown is that of the usual system, that is the pulse output from the timer 20 keys the modulator 21 which in turn forms a pulse of the proper time duration for keying the transmitter 22. The radio frequency energy thus generated by the transmitter then passes through the duplexer 23 to both the antenna (not shown) and to the receiver 24 where it is detected and applied to the cathode ray tube to produce an indication thereof as shown at T on the face of the cathode ray tube. By disposing both the transmitted pulse and the various echo signals caused thereby on a linear sweep of the cathode ray beam, a measure of the time interval elapsing between the transmission of a pulse and the reception of any particular echo signal can be obtained and hence a measure of the distance from the object producing the echo signal. To assure that the production of this sweep is maintained in absolute synchronism with the transmission of a pulse, the same pulse output from the timer 20 which keys the modulator also keys the wide gate generator 25 which produces a long time negative pulse as shown in plot "B" of Fig. 2. This negative wide gate pulse, which is slightly less in time duration than the interval elapsing between successive transmitted pulses, is then used to control the operation of the time marker generator, as subsequently described, and also the saw-tooth voltage generator 26. The latter, which is a type well known to the art, produces a saw-tooth voltage of a duration corresponding to that of the wide gate pulse, which in turn is applied in parallel through lead 37 to the horizontal deflecting plates of the cathode ray tube 19 to produce linear time sweep of the electron beam and to the control grid of the cathode follower tube 27. This cathode follower tube constitutes a variable time phase index marker generator, the accuracy and linearity of which it is desired to check by comparing its setting with various known range intervals as represented by the time markers. Disposed in the cathode circuit of the cathode follower is a graduated potentiometer 28 across the resistance of which is connected a source of positive voltage. The movable arm of this potentiometer is then normally adjusted so as to bias tube 27 to below cut-off so that zero voltage will be developed across the cathode resistor 30 until the cut-off bias is overcome. Whereupon the voltage developed across the cathode resistor will then follow the saw-tooth input to the control grid. The instant at which the cathode begins to follow the saw-tooth input is delayed in time from the inception of the input voltage by an amount which is dependent upon the setting of potentiometer 28. This delayed saw-tooth output voltage is then differentiated by capacitance 31 and resistance 32 and applied to one of the vertical deflecting plates of the cathode ray tube 19. It is known that if a saw-tooth wave is differentiated the output will consist of a single step voltage, the magnitude of which is proportional to the slope of the saw-tooth input. Thus since the saw-tooth output voltage from the cathode follower is delayed in time from its input by an amount which is dependent upon the setting of potentiometer 28 and since this delayed saw-tooth voltage wave is applied through a differentiating circuit to one of the vertical deflecting plates of the cathode ray tube, a vertical step or discontinuity (not shown here in order to simplify the illustration) will appear on the time sweep. Consequently by graduating potentiometer 28 in range and adjusting the step to lie in positional coincidence with an echo signal, the echo range can be read directly from the setting of the potentiometer.

By keying off both the saw-tooth generator 26 and the transmitter 22 from a single source, timer 20, absolute synchronism between the starting of the cathode ray beam sweep and the emission of a pulse can be readily maintained. In this manner the stability requirements of the timer are not rigid, which consequently, enables the use of any suitable device such as a free running multivibrator to serve as the timer. To graduate the time sweep on the cathode ray tube 19 a train of oscillations are first produced synchronously with the generation of a time sweep. These oscillations are then squared and sharpened and applied to the cathode ray tube in such a manner as to produce a series of equally time spaced marker pulses thereon. To accomplish this, one of the inductance-capacitance tank circuits 14, 15, or 16 is selectively connected into the cathode circuit of the keying tube 10 by way of the selector switch 33. The grid of this tube is returned through resistance 29 to a source of positive potential so that the inductance coil of the tank circuit contacted by the switch 33 is normally flooded with D. C. current. Now then if the current through this tank circuit is suddenly interrupted, by blocking tube 10, damped oscillations will occur in the tank circuit. To do this the control grid of tube 10 is connected through condenser 34 and the off-on switch 38 to the output of the wide gate generator 25. Thus as the negative output pulse from this circuit keys the saw-tooth generator into operation it also renders tube 10 blocked to thereby interrupt the current through the tank circuit. The resultant oscillations are shown in plot C of Fig. 2, which, as may be observed, always start from zero phase and swing negative to maximum amplitude during the first half cycle. If the Q, or ratio of inductive reactance to resistance of the tank coil is high enough, oscillations will persist for the duration of the time sweep, at the termination of which, tube 10 is restored to its normally conductive state by the trailing edge of the negative wide gate pulse "B" so that the flow of D. C. current through the tank inductance is resumed to thereby rapidly damp out further oscillation. By choosing the resonant frequency of the first inductance-capacitance tank circuit 14 so that its period is, say for instance, 12.34 microseconds, that is the time required for a radio wave to travel out one nautical mile and return the time markers can be made to occur at what corresponds to one mile range intervals. While by choosing the resonant frequencies of the other tank circuits 15 and 16, at different values, time marker signals can be made to occur at alternate range intervals, as desired. The damped oscillations thus produced are then coupled through resistance 35 to the grid of the squaring amplifier 11. This amplifier contains a small positive bias (about +5 volts) on its cathode so as to bias it in compensation for the resistive drop in the inductance of the tank circuit. With this value of bias the oscillations will drive the grid of tube 11 beyond both cut-off and saturation on alternate half cycles. Now then since this tube is driven beyond saturation grid current will flow to thus produce a voltage drop across the resistance 35 and hence clip the positive inputs directly in the grid circuit while the negative inputs are clipped in the plate circuit. Hence the actual alternating grid to cathode voltage for tube 11 is shown in plot D while the corresponding plate output voltage is shown in plot E. The latter is seen to be slightly asymmetrically arranged about the plate operating level, i. e. the plate swings slightly more positive than it does negative. This is due to the operating bias which permits the grid to be driven more negative before it reaches cut-off than positive to reach saturation. To prevent excessive grid current from flowing which would result in excessive damping of the oscillations and also to prevent damage to the tube due to grid current, the size of resistor 35 should be carefully considered. For instance, in one case a resistor of 50,000 ohms was found desirable. The output of tube 11 is then fed through a resistive-capacitive coupling circuit to a second squaring amplifier 12. This amplifier also has a small positive bias (about +5 volts) on its cathode circuit so that it will fully amplify the positive inputs but drive beyond cut-off on the negative inputs. Thus the plate voltage alternations of this tube are likewise asymmetrically arranged about the plate operating level, the plate swinging more strongly negative than positive as shown in plot F of Fig. 2. The output of this last squaring amplifier is then fed through an R. C. coupling network comprising condenser 36 and resistance 17 to the grid of the pulse sharpening amplifier 13 which is here shown as a triode the grid of which is returned through resistance 17 to a source of positive voltage so as to maintain this tube normally conducting. Disposed in the plate circuit of this latter tube is a low Q inductance coil 18 which is tuned by its distributed capacitance to say 2 megacycles so that as the grid of tube 13 is driven negative by the plate of tube 12, a sharp decrease in current through the inductance is experienced to thereby shock excite the latter into oscillation. These oscillations are applied through condenser 39 to the vertical deflecting plate, for instance, of the cathode ray tube and as shown in plot H of Fig. 2, are highly damped by reason of the low value of Q of the inductance coil, so that only the first cycle which corresponds to a .5 microsecond pulse is visible on the cathode ray tube as indicated at $m$. It will be seen from plot G, of Fig. 2 which represents the grid voltage input to tube 13 that after the plate of tube 12 drives the grid of tube 13 negative the condenser 36 begins to charge through resistance 17 and tube 12 to thus form the slope K on the bottom of the negative grid pulse. Then at the end of the first half cycle of tank circuit oscillation when the plate of tube 12 is driven positive of its operating level condenser 36 begins to charge through the plate resistance of tube 12 and resistance 17 to produce the sharp overshoot $p$ on the grid voltage of tube 13. This overshoot causes tube 13 to draw slightly more current than normal so that inductance 18 is shocked into oscillations as shown at $n$ of a phase opposite to that which represents the marker pulse $m$.

In summarizing, it is obvious that when the potentiometer 28 is set so as to cause the index marker to lie in positional correspondence with one of the time marker pulses of the class described and which represents a known range interval, any inaccuracy of the setting of the potentiometer can be easily observed and steps taken to correct the error therein.

If desired, the output of the pulse sharpening tube 13 can be coupled to the cathode ray tube through a cathode follower tube which is biased to cut-off so that only the first half cycle of oscillation from the inductance 18 will appear on the cathode ray tube. Furthermore intensity modulation can be used to represent the position of the time marker pulses by simply impressing the output of the pulse sharpening tube on the intensity grid of the cathode ray tube. In fact this last named method of indicating the position of the range markers is quite frequently used, especially where the markers are to be held continually on the time sweep. In the case of a rotating radial sweep, where such a system is often used, the range markers appear as a series of concentric intensified rings on the cathode ray tube screen.

Although I have shown and described only a certain and specific embodiment of the invention, I am fully aware of the many modifications possible therein. Therefore, this invention is not to be limited except insofar as is necessitated by the prior art and the spirit of the appended claims.

What is claimed is:

1. A means for producing a sequential series of time markers on the sweep of a cathode ray tube, comprising a tuned circuit, means for normally flooding said tuned circuit with current, means for interrupting said current flow in synchronism with the initiation of the sweep line on said cathode ray tube to thereby shock excite said tuned circuit into oscillations, means for transforming said oscillations into a series of equally time spaced impulses, and means for applying said impulses to the sweep of said cathode ray tube.

2. A visual indicator time axis calibrating system comprising means for producing a discontinuous train of oscillations, including a vacuum tube having at least an anode and a cathode, an inductance-capacitance tuned circuit interposed between the cathode of said tube and ground, means for normally biasing said tube to pass current, means for rendering said tube blocked to thereby interrupt the current flow therethrough and hence shock excite said tuned circuit into oscillations, means for transforming said oscillations into a series of equally time spaced impulses, and means applying said impulses to said visual indicator produce visual indications on the time axis thereof.

3. A visual indicator time axis calibrating system comprising means for producing a discontinuous train of oscillations, including a vacuum tube having at least an anode and a cathode, an inductance-capacitance tuned circuit interposed between the cathode of said tube and ground, means for normally biasing said tube to pass current, means for rendering said tube blocked to thereby interrupt the current flow therethrough and hence shock excite said tuned circuit into oscillations, means for transforming said oscillations into rectangular voltage waves, a low Q inductance coil, means for shock exciting said low Q coil in response to said rectangular waves to thereby produce a series of equally time spaced impulses, and means applying said impulses to said visual indicator to produce visual indications on the time axis thereof.

4. A visual indicator time axis calibrating system comprising means for producing a discontinuous train of oscillations, including a vacuum tube having at least an anode and a cathode, an inductance-capacitance tuned circuit interposed between the cathode of said tube and ground, means for normally biasing said tube to pass current, means for rendering said tube blocked to thereby interrupt the current flow therethrough and hence shock excite said tuned circuit into oscillations, and a second vacuum tube having at least an anode, a cathode and a grid, means coupling said oscillations to the grid of said second tube, means biasing said tube so that it will drive beyond saturation and cut-off in response to said oscillation to thereby cause a rectangular wave output to occur in the plate circuit thereof, a low Q inductance coil, means for shock exciting said low Q coil in response to the rectangular output from said second tube to thereby produce a series of equally time spaced impulses, and means applying said impulses to said visual indicator to produce visual indications on the time axis thereof.

5. A cathode ray tube time axis calibrating system comprising means for producing a discontinuous train of oscillations, including a vacuum tube having at least an anode and a cathode, an inductance-capacitance tuned circuit interposed between the cathode of said tube and ground, means for normally biasing said tube to pass current, means for rendering said tube blocked to thereby interrupt the current flow therethrough and hence shock excite said tuned circuit into oscillations, means transforming said oscillations into rectangular voltage waves, a second tube having at least an anode a cathode and a grid, a low Q inductance connected in the anode circuit of said second tube, means for causing the second tube to normally pass current through said inductance, means applying said rectangular voltage waves to said second tube to thereby periodically block the latter and means applying the output of said second tube to said cathode ray tube.

6. A visual indicator time axis calibrating system comprising means for producing a discontinuous train of oscillations, said means including a vacuum tube having at least an anode and a cathode, an inductance-capacitance tuned circuit interposed between the cathode of said tube and ground, means for normally biasing said tube to pass current, means for rendering said tube nonconducting to interrupt the flow of current therethrough in predetermined time phase with a reference time of said time axis, said interruption of current through said tube serving to shock excite said tuned circuit into oscillation, at least one voltage amplifier responsive to said oscillations and adapted to be driven beyond cutoff on one extreme of said oscillations and to saturation on the other extreme of said oscillations, thereby to produce a rectangular voltage wave at the frequency of said oscillation, means responsive to said rectangular voltage wave for producing a series of equally time spaced impulses in predetermined time phase therewith, and means applying said impulses to said visual indicator to produce visual indications on the time axis thereof.

7. A visual indicator time axis calibrating system comprising means for producing a discontinuous train of oscillations, said means including an electron tube having at least an anode and a cathode, an inductance-capacitance tuned circuit interposed between the cathode of said tube and ground, means for normally biasing said tube to pass current, means for rendering said tube nonconducting to interrupt the flow of current therethrough in predetermined time phase with a reference time of said time axis, said interruption of current through said tube serving to shock excite said tuned circuit into oscillation, at least one voltage amplifier responsive to said oscillations and adapted to be driven beyond cutoff on one extreme of said oscillations and to saturation on the other extreme of said oscillations, thereby to produce a rectangular voltage wave at the frequency of said oscillation, a second electron tube having at least an anode, a cathode and a grid, a low Q inductance connected in the anode-cathode circuit of said second tube, means for causing said second tube normally to pass current through said inductance, means for coupling said rectangular waves to said grid of said second tube to thereby periodically block the latter, and means applying the output of said second tube to said visual indicator to produce visual indications on the time axis thereof.

8. A visual indicator time axis calibrating system comprising means for producing a discontinuous train of oscillations, said means including an electron tube having at least an anode and a cathode, a plurality of inductance-capacitance tuned circuits, each having a different resonant frequency, switch means for selectively connecting one of said tuned circuits between the cathode of said tube and ground, means for rendering said tube nonconducting to interrupt the flow of current therethrough in predetermined time phase with a reference time of said time axis, said interruption of current through said tube serving to shock excite into oscillation said tuned circuit connected to said cathode, at least one voltage amplifier responsive to said oscillations and adapted to be driven beyond cutoff on one extreme of said oscillations and to saturation on the other extreme of said oscillations, thereby to produce a rectangular voltage wave at the frequency of said oscillation, means responsive to said rectangular voltage wave for producing a series of equally time spaced impulses in predetermined time phase therewith, and means applying said impulses to said visual indicator to produce visual indications on the time axis thereof.

9. A visual indicator time axis calibrating system comprising means for producing a discontinuous train of oscillations, said means including a vacuum tube having at least an anode and a cathode, an inductance-capacitance tuned circuit connected in the anode-cathode circuit of said tube in series with a current source, means for normally biasing said tube to pass current, means for rendering said tube nonconducting to interrupt the flow of current therethrough in predetermined time phase with a reference time of said time axis, said interruption of current through said tube serving to shock excite said tuned circuit into oscillation, at least one voltage amplifier responsive to said oscillations and adapted to be driven beyond cutoff on one extreme of said oscillations and to saturation on the other extreme of said oscillations, thereby to produce a rectangular voltage wave at the frequency of said oscillation, means responsive to said rectangular voltage wave for producing a series of equally time spaced impulses in predetermined time phase therewith, and means applying said impulses to said visual indicator to produce visual indications on the time axis thereof.

10. A visual indicator time axis calibrating system comprising means for producing a discontinuous train of oscillations, said means including a source of current, an inductance-capacitance tuned circuit, switch means normally connecting said source of current to said tuned circuit to flood said tuned circuit with current, means for rendering said switch means inoperative to pass current in predetermined time phase with a reference time of said time axis, said interruption of current through said switch serving to shock excite said tuned circuit into oscillation, means responsive to said oscillations and adapted to generate a rectangular voltage wave at the frequency of said oscillation, a second source of current, a low Q inductance, second switch means connecting said second source of current to said low Q inductance to normally flood said inductance with current, and means for coupling said rectangular voltage wave to said second switch means to cause said second switch means to be inoperative to pass current on alternate half cycles including the first half cycle of said rectangular voltage wave, said low Q inductance thereby producing a series of equally time spaced impulses in predetermined time phase with said reference time, and means for applying said impulses to said visual indicator to produce visual indications on the time axis thereof.

11. A visual indicator time axis calibrating system comprising means for producing a discontinuous train of oscillations, said means including a first source of current, an inductance-capacitance tuned circuit, first switch means normally connecting said source of current to said tuned circuit to flood said tuned circuit with current, means for rendering said first switch means inoperative to pass current in predetermined time phase with a reference time of said time axis, said interruption of current through said switch serving to shock excite said tuned circuit into oscillation, a second source of current, a highly damped, tuned circuit, second switch means connecting said second source of current to normally flood said highly damped, tuned circuit with current, and means for coupling said shock excited oscillations to said second switch means to cause said second switch means to be inoperative to pass current on alternate half cycles of said oscillation beginning with the first half cycle, said highly damped, tuned circuit thereby producing a series of equally time spaced impulses in predetermined time phase with said reference time, and means for applying said impulses to said visual indicator to produce visual indications on the time axis thereof.

CHALMERS W. SHERWIN.

REFERENCES CITED

The following references are of record in the file of this patent:

UNITED STATES PATENTS

| Number | Name | Date |
|---|---|---|
| 2,423,304 | Fitch | July 1, 1947 |
| 2,474,219 | Busignies | June 28, 1949 |

OTHER REFERENCES

Sherman, "The Generation for Television of Horizontal Synchronizing Pulses from Vertical Pulses by Means of Impulse Excitation," Proceedings of I. R. E., Sept. 1940, pgs. 406–409.